Figure 1:
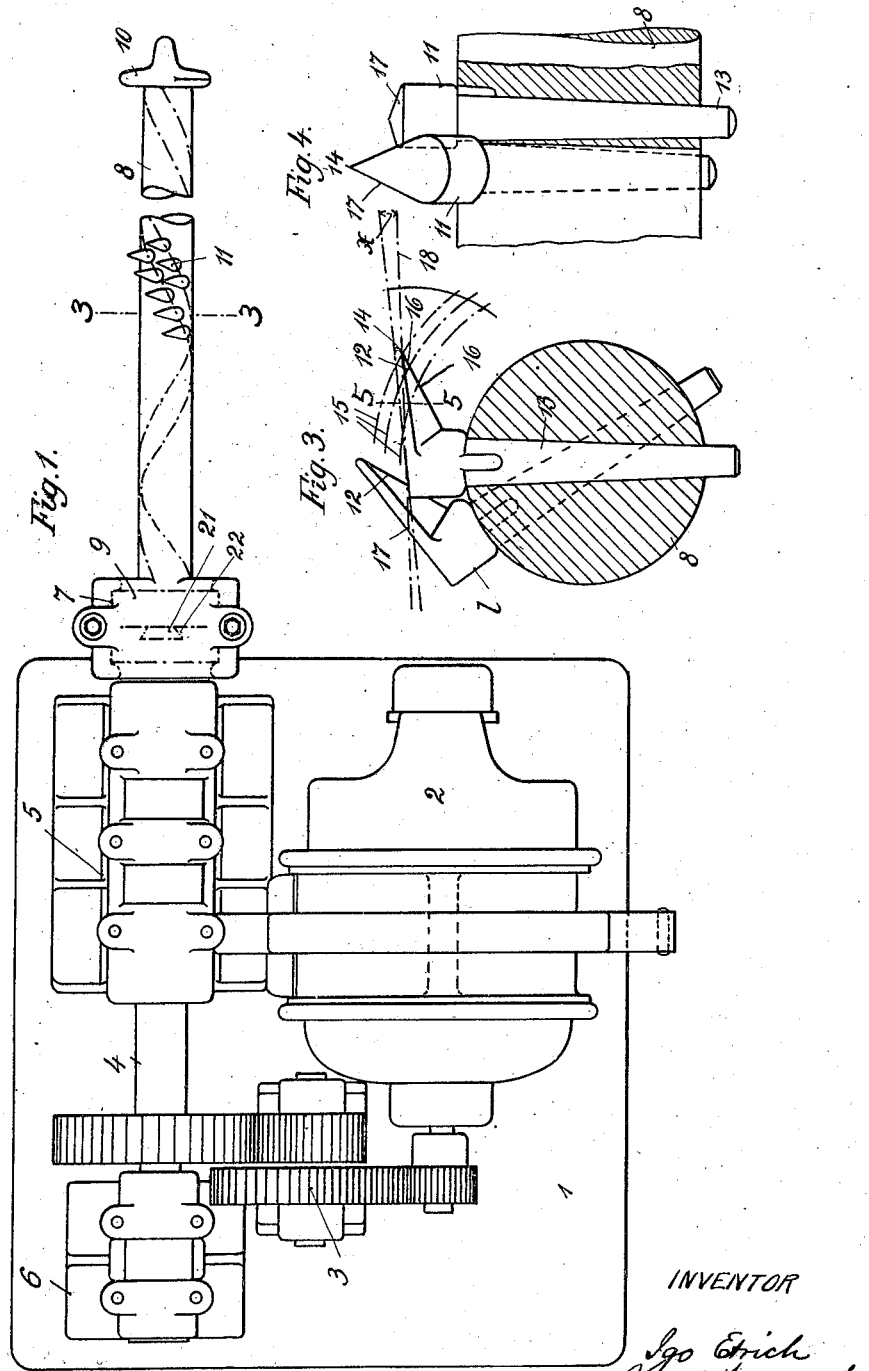

Patented Oct. 30, 1923.

1,472,641

UNITED STATES PATENT OFFICE.

IGO ETRICH, OF GRUNWALD, NEAR MUNCHEN, GERMANY, AND RUDOLF WANNENMACHER, OF TRAUTENAU, CZECHOSLOVAKIA.

COAL-CUTTING MACHINE AND TOOL.

Application filed March 28, 1923. Serial No. 628,366.

*To all whom it may concern:*

Be it known that we, IGO ETRICH, a citizen of the Czechoslovakian Republic, residing at Grunwald, near Munchen, Germany, and RUDOLF WANNENMACHER, a citizen of the Czechoslovakian Republic, residing at Trautenau, Czechoslovakia, have invented certain new and useful Coal-Cutting Machines and Tools; and we do hereby declare the following to be a full, clear, and exact description of the invention, such as will enable others skilled in the art to which it appertains to make and use the same.

Our invention relates to improvements in coal cutting machines and tools, and more particularly in machines and tools suitable for cutting coal in strata of comparatively small height. As now practiced strata of small height are cut by handwork because the use of machinery is uneconomical, such machinery as now constructed being large and heavy. The object of the improvements is to provide a coal cutting machine which by reason of its reduced weight can be operated by one man. With this object in view we provide a machine which is simple in construction and which is operated by a motor of small power. For this purpose our improved machine shows various novel features which individually and in combination have the results aimed at.

In machines now in use the cutting tool has an axial reciprocating movement in addition to the rotary movement. We have found that for the class of work to be done by our improved machine such reciprocating movement should be dispensed with in order to obtain a simple construction. In cutting tools such as are now in use the cutting members are disposed spirally around the circumference of the spindle of the tool, and the constructions now in use are objectionable for the reason that they require much power and are subject to heavy wear, the cutting edges becoming dull after a comparatively short period of time. By constructing the tool in the manner to be described hereinafter the resistance opposed to cutting is materially reduced, and the wear of the cutting members is such that the said members are automatically reground by the wear.

A tool constructed as indicated and described hereinafter may be mounted in a machine which is simple in construction, and which requires small power, the power being adapted to the normal cutting resistance, because there is no increase of resistance by the wear of the tool. A machine of this construction is simple in operation, and its weight can be reduced to such an extent that it is automatically guided by the cutting tool. To permit such guiding by the tool we prefer to mount the machine on springs taking up substantially the whole weight of the machine, so that the machine is enabled to follow the movements of the cutting tool. This construction shows the advantage that the tool is not forced forwardly by the weight of the machine in case of an increased resistance caused for example by rock embedded in the coal, and it is adapted to move sideways so as to avoid the rock. Thereby the wear of the tool is reduced.

Figure 2:
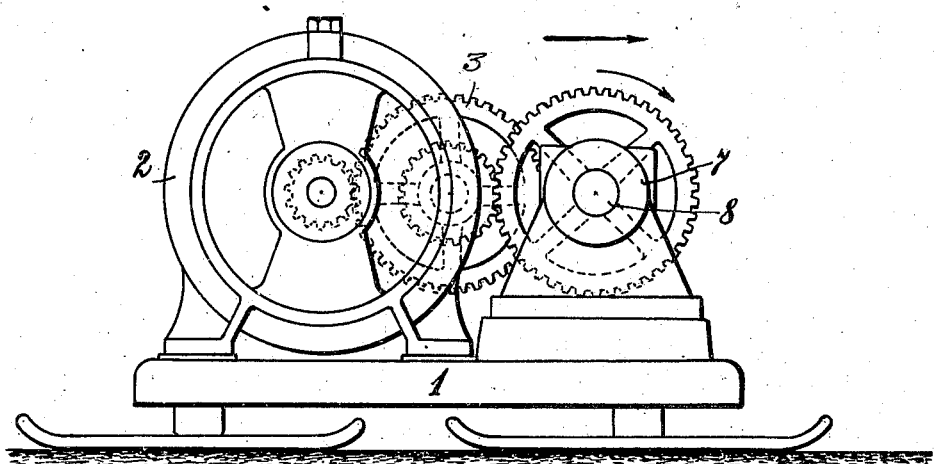
Figure 5:
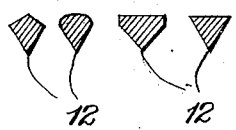

In order that the invention be more clearly understood several examples embodying the same have been shown in the accompanying drawings in which the same reference characters have been used in all the views to indicate corresponding parts. In said drawing, Fig. 1, is a plan view of the machine, Fig. 2, is an elevation thereof, Fig. 3, is a cross-section on an enlarged scale of the cutting tool taken on the line 3—3 of Fig. 1, Fig. 4, is a detail view on an enlarged scale showing a part of the cutting tool, Fig. 5, shows sections taken on the line 5—5 of Fig. 3 and illustrating various examples of the cutting member.

Referring to the example illustrated in

Figs. 1 to 5, our improved machine comprises a base plate 1 having a motor 2 mounted thereon. In bearings 5 and 6 a shaft 4 is mounted which is adapted to be rotated from the motor through the intermediary of a suitable gearing 3. As shown the bearing 5 disposed at the front or cutting side of the machine is long and heavy as compared to the rear bearing 6. The front end of the shaft 4 is provided with a clutch member 7 for connecting the spindle 8 of the cutting tool thereto. As shown the said spindle is made integral with a head or flange 9 adapted for coupling engagement with the clutch member 8, and it has a cutting head 10 secured to its front end. Cutters 11 are disposed spirally around the stem, and they are secured thereto by means of tapering shafts 13 fitted in corresponding holes, as is known in the art.

An important feature of our invention resides in the construction of the cutters, the object being to keep the edges sharp and thereby to avoid an increase of the power required for operating the cutter. As appears more particularly from Figs. 3 to 5, the cutting portion of the cutters is substantially triangular in cross-section, the point of the triangle being directed towards the spindle of the cutter. The cutting portion tapers from the foot to the point 14 thereof. The wear of the cutter proceeds along the circular lines 15 shown in Fig. 3. Therefore as the wear proceeds, continuously new cutting points 16 are formed, so that the tool is always sharp. In addition the position of the outer face 17 relatively to the circumferential path thereof is such that its angle with the tangent of the circular path is small. Therefore, in cutting a comparatively small part of the cutter gets into the coal, so that the cutter is not clamped in the coal.

The cutting members are located in close relation to one another. At the rear of the front set of cutting members disposed along a spiral, a second set of cutting members is provided which are likewise set along a spiral, and the cutting edge of the cutting members of both sets are displaced with relation to each other, so that the cutting members of one set work between the cutting members of the other set, and the coal left by one set of cutting members is directly broken by the cutting members of the succeeding set. By thus providing several sets of cutting members one behind the other and displacing the members with relation to one another axial reciprocating movement of the cutting tool may be dispensed with.

By reason of the construction of the cutting tool described herein, and more particularly by the novel configuration of the cutting members insuring sharp edges in case of wear, the power required for operating the tool remains constant, so that a comparatively small motor 2 may be provided, so much the more as the most favorable angle of the cutting member relatively to the path thereof is insured. For example for operating a cutting tool of a length of one meter and a diameter of 2 inches a motor of about 3 H. P. is sufficient. The aggregate weight of the machine including the gear 4 and the base plate 1 is about 200 kilogrammes. This weight can easily be handled by one man by means of a hoist.

Fig. 5 shows several examples of preferred cutting members. The important feature which is common to all of the cross-sections is that there is an edge 12 located at the side of the spindle, which edge insures automatic re-sharpening of the cutter by the wear thereof.

In the construction of the machine the clutch 7 is preferably constructed so as to permit dismounting of the spindle 8 in a direction parallel to its axis. In the example shown in Fig. 1 the flange 9 of the spindle 8 carries a dove-tailed portion 21 engaging in a corresponding groove 22 of the cooperating head of the shaft 4, and both flanges are held together by a bearing block 7. If it is desired to dismount the spindle 8 the bearing block 7 is removed and the spindle is turned until the portion 21 is in horizontal position, whereupon the spindle can be removed while engaging with its cutting head in the cut made thereby.

While in describing the invention reference has been made to particular examples embodying the same we wish it to be understood that our invention is not limited to the constructions shown in the drawings, and that various changes may be made in the general arrangement of the apparatus and the construction of its parts without departing from the invention.

We claim:

1. A cutting tool for machines for cutting coal, rock, and the like, comprising a carrier, and a cutting member directed forwardly from said carrier and at an acute angle to the cutting direction and tapering from the carrier forwardly into a point and formed at the side of the carrier with an edge extending from a part near the carrier to the point.

2. A cutting tool for machines for cutting coal, rock, and the like, comprising a rotary carrier, a cutting head provided on said carrier, cutting members on said carrier, and a cutting member on said head directed forwardly from said head and at an acute angle to the cutting direction and tapering from the head forwardly into a point and formed at the side of the head with an edge extending from a part near the head to the point.

3. In a machine of the class described, the combination, with a rotary shaft, and bearing and driving means therefore, of a cutter spindle carried by said shaft, and coupling means intermediate said shaft and spindle permitting the spindle to be dismounted transversely of this axis.

In testimony whereof we hereunto affix our signatures in the presence of two witnesses.

IGO ETRICH.

Witnesses:
 THEA JOHANNA KELLER,
 A. MUVERPY.

ING. RUDOLF WANNENMACHER.

Witnesses:
 REID THUEL,
 D. SERREZ.